(12) United States Patent
Genda et al.

(10) Patent No.: US 9,696,469 B2
(45) Date of Patent: Jul. 4, 2017

(54) MULTILAYER DIFFRACTIVE OPTICAL ELEMENT

(71) Applicant: CANON KABUSHIKI KAISHA, Tokyo (JP)

(72) Inventors: Hideo Genda, Tokyo (JP); Maiko Niwa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/850,804

(22) Filed: Sep. 10, 2015

(65) Prior Publication Data

US 2016/0077251 A1 Mar. 17, 2016

(30) Foreign Application Priority Data

Sep. 12, 2014 (JP) ................. 2014-186856

(51) Int. Cl.
*G02B 5/18* (2006.01)
*B29D 11/00* (2006.01)

(52) U.S. Cl.
CPC ...... *G02B 5/1866* (2013.01); *B29D 11/00269* (2013.01); *G02B 5/189* (2013.01); *G02B 5/1857* (2013.01); *G02B 5/1895* (2013.01)

(58) Field of Classification Search
CPC ...... G02B 5/18; G02B 5/1809; G02B 5/1814; G02B 5/1842; G02B 5/1866; G02B 5/1876; G02B 3/08
USPC ....... 359/558, 566, 567, 569, 570, 571, 574, 359/575, 576, 742, 743; 369/112.03–112.07, 112.11–112.12
See application file for complete search history.

(56) References Cited

U.S. PATENT DOCUMENTS

| | | | |
|---|---|---|---|
| 2002/0024734 A1* | 2/2002 | Nakabayashi ....... | G02B 5/1814 359/569 |
| 2003/0112515 A1* | 6/2003 | Nakabayashi ....... | G02B 5/1866 359/571 |
| 2003/0218803 A1 | 11/2003 | Nakabayashi | |
| 2009/0141354 A1* | 6/2009 | Kobayashi ......... | B29D 11/0073 359/571 |
| 2011/0013284 A1* | 1/2011 | Ushigome ............ | G02B 5/1823 359/576 |
| 2013/0088781 A1* | 4/2013 | Suenaga .......... | B29D 11/00269 359/566 |

FOREIGN PATENT DOCUMENTS

| | | |
|---|---|---|
| EP | 1584956 A1 | 10/2005 |
| EP | 2662205 A2 | 11/2013 |
| JP | 2005-305875 A | 11/2005 |
| JP | 2007-212547 A | 8/2007 |
| JP | 2013-160773 A | 8/2013 |

* cited by examiner

*Primary Examiner* — Kimberly N Kakalec

(74) *Attorney, Agent, or Firm* — Canon USA, Inc. IP Division

(57) ABSTRACT

A multilayer diffractive optical element includes a first substrate, a second substrate, a first resin layer having a first diffraction grating pattern and interposed between the first substrate and the second substrate, and a second resin layer having a second diffraction grating pattern and interposed between the first substrate and the second substrate. The first resin layer includes a first region provided at a peripheral portion adjacent to a portion of the first diffraction grating pattern. The first resin layer includes a second region provided at a peripheral portion adjacent to the first region.

8 Claims, 5 Drawing Sheets

MULTILAYER DIFFRACTIVE OPTICAL ELEMENT

BACKGROUND OF THE INVENTION

Field of the Invention

The present invention relates to multilayer diffractive optical elements. In particular, the present invention relates to a multilayer diffractive optical element in which two layers of resin each having a diffraction grating pattern are interposed between substrates of glass or the like.

Description of the Related Art

A multilayer diffractive optical element having a diffraction grating pattern formed on a boundary face between two kinds of optical materials is known as a diffractive optical element to be used for a lens or the like. Japanese Patent Laid-Open No. 2007-212547 discloses the following technique. Specifically, a resin layer having a diffraction grating pattern is formed on a glass substrate, and then a resin having different optical characteristics is interposed between the formed resin layer and another glass substrate and is cured to thus be bonded.

In addition, Japanese Patent Laid-Open No. 2013-160773 discloses a method for manufacturing a diffractive optical element having a grating pattern with high precision. In that method, the diffractive optical element is manufactured by using a mold having a groove portion provided at a periphery of the grating pattern.

However, the multilayer diffractive optical element manufactured through the manufacturing method disclosed in Japanese Patent Laid-Open No. 2013-160773 has shortcomings in that resin peeling occurs after the diffractive optical element is used for an extended period of time in a high-temperature environment.

With regard to what causes the resin peeling to occur, the present inventor has found the following. When a diffractive optical element is manufactured through the manufacturing method disclosed in Japanese Patent Laid-Open No. 2013-160773, a diffractive optical element having a protrusion at a periphery of a diffraction grating pattern is obtained. When a multilayer diffractive optical element is manufactured with the use of the aforementioned diffractive optical element through the manufacturing method disclosed in Japanese Patent Laid-Open No. 2007-212547, uncured resin is placed on the diffractive optical element. Since there is a step due to the protrusion at the periphery of the diffractive optical element, when the uncured resin is cured, large stress remains at the step portion due to the cure shrinkage. In addition, when a multilayer diffractive optical element is used for an extended period of time, the bonding strength at an interface between a resin layer and a glass substrate gradually decreases due to the moisture in the air entering therebetween. Furthermore, when a multilayer optical element is used for an extended period of time, the bonding strength at the interface becomes smaller than the stress remaining at the step portion, and thus the resin peeling occur in some cases.

In the meantime, in the field of adhesive technology, a technique is known in which a portion with a step is made into a gently sloped shape or a tapered shape so as to allow the film thickness of the adhesive to vary continuously. Thus, the stress that remains when the adhesive is cured is dispersed so as to prevent the peeling from occurring.

However, when the tapered shape is applied to the multilayer diffractive optical element, a broad area needs to be secured outside an optically effective region in order to sufficiently disperse the stress to an extent that the resin peeling is prevented from occurring, and there is a problem in that the size of the optical element is increased.

SUMMARY OF THE INVENTION

The present invention provides a multilayer diffractive optical element that includes a first substrate, a second substrate, a first resin layer having a first diffraction grating pattern and interposed between the first substrate and the second substrate, and a second resin layer having a second diffraction grating pattern and interposed between the first substrate and the second substrate. The first resin layer includes a first region provided at a peripheral portion adjacent to a portion of the first diffraction grating pattern, and the first region satisfies $1 \leq h/hd$, in which h represents a thickness of the first resin layer in a direction normal to a surface of the first substrate, and hd represents an average grating height of the first diffraction grating pattern. The first resin layer includes a second region provided at a peripheral portion adjacent to the first region, and the second region satisfies $h/h1 \leq 0.34$, in which h1 represents an average thickness of the first region. Expression (1) below is satisfied, $$50 \leq w1/hd \text{ and } 0.5 \leq w2/w1 \qquad (1),$$

in which w1 represents a width of the first region in a radial direction along a plane parallel to the surface of the first substrate, and w2 represents a width of the second region in the radial direction along a plane parallel to the surface of the first substrate.

Further features of the present invention will become apparent from the following description of exemplary embodiments with reference to the attached drawings.

DESCRIPTION OF THE EMBODIMENTS

Hereinafter, exemplary embodiments of the present invention will be described with reference to the drawings.

It is to be noted that the present invention is not limited to the exemplary embodiments described hereinafter.

Multilayer Diffractive Optical Element

Figure 1A:
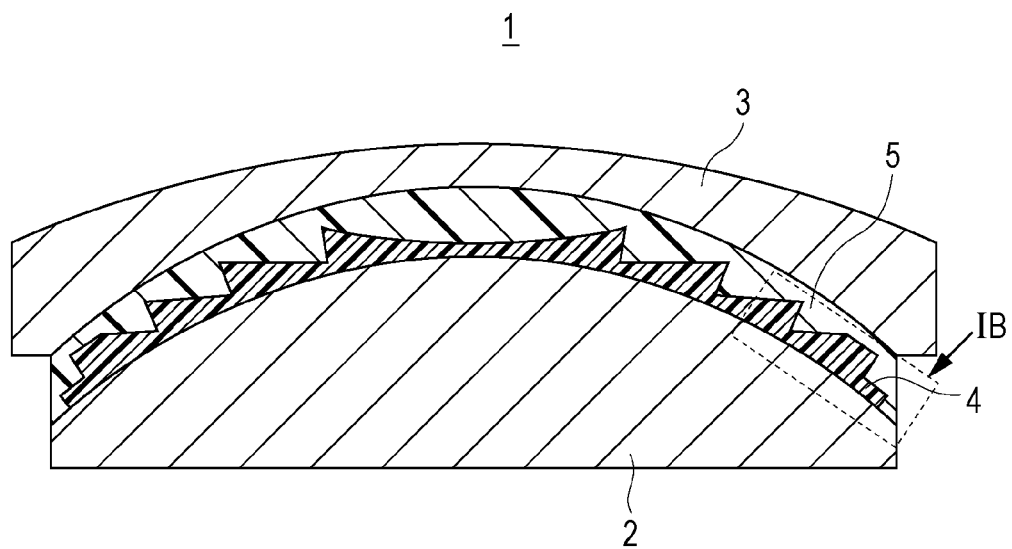
FIG. 1A is a schematic diagram of a multilayer diffractive optical element according to an exemplary embodiment of the present invention.

As illustrated in FIG. 1A, a multilayer diffractive optical element 1 according to an exemplary embodiment of the present invention includes a first substrate 2, a second substrate 3, a first resin layer 4 having a first grating pattern, and a second resin layer 5 having a second grating pattern; and the first resin layer 4 and the second resin layer 5 are interposed between the first substrate 2 and the second substrate 3. The multilayer diffractive optical element 1 according to an exemplary embodiment of the present invention can preferably be used in a diffractive optical lens.

Figure 1B:
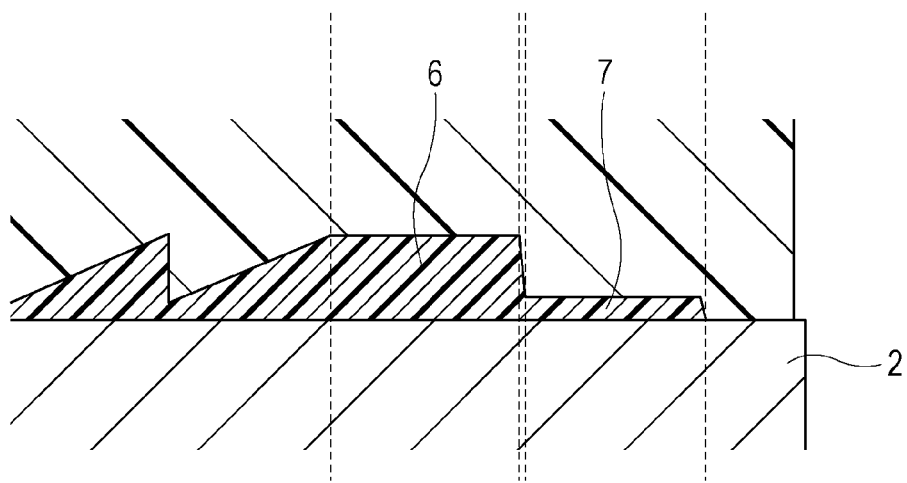
FIG. 1B is an enlarged schematic diagram illustrating part of a multilayer diffractive optical element according to an exemplary embodiment of the present invention.

As illustrated in FIG. 1B, the first resin layer 4 has the following shape at a peripheral portion that is adjacent to a portion of the first diffraction grating pattern; and in the following, h represents the thickness of the first resin layer 4 in the direction normal to a surface of the first substrate 2, and hd represents the average grating height of the first diffraction grating pattern. FIG. 1B is an enlarged view of a portion enclosed by the broken line in FIG. 1A. The first resin layer 4 includes a plurality of gratings in an optically effective area, and a first region 6 that satisfies 1≤h/hd provided on an optically ineffective surface at a peripheral portion adjacent to the plurality of gratings. In addition, the first resin layer 4 includes a second region 7 that satisfies h/h1≤0.34 provided in a peripheral portion adjacent to the first region 6, and h1 represents the average thickness of the first region 6.

The multilayer diffractive optical element 1 according to an exemplary embodiment of the present invention satisfies the condition of Expression (1) below, in which w1 represents the width of the first region 6 in the radial direction along a plane parallel to the surface of the first substrate 2 and w2 represents the width of the second region 7 in the radial direction along a plane parallel to surface of the first substrate 6.

$$50 \leq w1/hd \text{ and } 0.5 \leq w2/w1 \quad (1)$$

The multilayer diffractive optical element 1 according to an exemplary embodiment of the present invention includes the first region 6 of the above condition provided in the first resin layer 4, and thus an occurrence of a sink mark in the manufacturing can be suppressed. Accordingly, the multilayer diffractive optical element 1 has high diffraction efficiency. In addition, the multilayer diffractive optical element 1 according to an exemplary embodiment of the present invention includes the second region 7 provided in the first resin layer 4, and thus resin peeling can be suppressed.

The multilayer diffractive optical element 1 according to an exemplary embodiment of the present invention can be used for a camera lens, a lens for a liquid-crystal projector, or a pick-up lens for DVDs and CDs. Substrate The first substrate 2 and the second substrate 3 to be included in the multilayer diffractive optical element 1 according to an exemplary embodiment of the present invention can be formed of a transparent resin, a transparent glass, or the like. The first substrate 2 and the second substrate 3 are preferably formed of glass. For example, a typical optical glass, such as a silica glass, a borosilicate glass, and a phosphate glass, a quartz glass, or a glass-ceramic glass can be used.

The surface shape of the first substrate 2 and the second substrate 3 can be, but is not limited to be, for example, concave spherical, convex spherical, axisymmetric aspherical, or planar. However, it is preferable that the surface shape of the first substrate 2 at a side where the first substrate 2 makes contact with the first resin layer 4 be substantially the same as the surface shape of the second substrate 3 at a side where the second substrate 3 makes contact with the second resin layer 5. The first and second substrates 2 and 3 can take a variety of external shapes, but the external shape is preferably circular.

It is preferable that the surfaces of the first substrate 2 and the second substrate 3 that are to come into tight contact with the respective resin layers be subjected to pretreatment so as to increase the adhesion with the respective resin layers. In a case in which glass is used for the substrates, it is preferable that coupling treatment with the use of a variety of silane coupling agents having good affinity with the resin layers be performed as the pretreatment on the glass surfaces. Specific coupling agents that can be used include hexamethyldisilazane, methyltrimethoxysilane, trimethylchlorosilane, and triethylchlorosilane.

First and Second Resin Layers

The multilayer diffractive optical element 1 according to an exemplary embodiment of the present invention includes the first resin layer 4 having the first diffraction grating pattern and the second resin layer 5 having the second diffraction grating pattern. In the present specification, the diffraction grating pattern is a pattern in which a plurality of diffraction gratings are contiguously formed. The diffraction grating pattern is preferably a recurring pattern of a surface that is gently sloped in the radial direction from the center to the periphery and a step that is provided at a predetermined distance from the beginning of a gentle slope and at which the slope changes steeply in the opposite direction. Such a pattern is used in a Fresnel lens, a diffraction lens, or the like. The interval of the recurring pattern becomes successively smaller from the center toward the periphery, and the steps are substantially equal to one another. In addition, the slope does not need to be smooth and may be a slope with a fine step of approximately a size equivalent to a wavelength of visible light or less.

It is preferable that the first resin layer 4 and the second resin layer 5 according to an exemplary embodiment of the present invention have different optical characteristics. Specifically, it is preferable that one of the first resin layer 4 and the second resin layer 5 have a higher refractive index and be less dispersive and that the other have a lower refractive index and be more dispersive. The resin layer that has a higher refractive index and is less dispersive preferably has a refractive index of no less than 1.54 and no greater than 1.63 and an Abbe number of no less than 42 and no greater than 57, and more preferably has a refractive index of no less than 1.60 and no greater than 1.63 and an Abbe number of no less than 42 and no greater than 46. Meanwhile, the resin layer that has a lower refractive index and is more dispersive preferably has a refractive index of no less than 1.48 and no greater than 1.57 and an Abbe number of no less than 14 and no greater than 28, and more preferably has a refractive index of no less than 1.54 and no greater than 1.57 and an Abbe number of no less than 18 and no greater than 22.

It is preferable that the resin to be used for the first resin layer 4 and the second resin layer 5 according to an exemplary embodiment of the present invention be an energy-curable resin. In particular, an ultraviolet-curable resin is more preferably used. Specifically, an acrylic resin and an epoxy resin can be used as the ultraviolet-curable resin. In addition, the first resin layer 4 and the second resin layer 5 may be formed of a material in which an organic substance or an inorganic substance other than the resin is mixed, in order to adjust the optical properties and the mechanical properties.

In addition, it is preferable that the first resin layer 4 and the second resin layer 5 contain metal oxide fine particles. The metal oxide fine particles that can be used are fine particles of one or more kinds selected from the group consisting of zinc oxide, indium oxide, tin oxide, antimony oxide, tin-doped indium oxide (ITO), antimony-doped tin oxide (ATO), zinc-doped indium oxide (IZO), aluminum-doped zinc oxide (AZO), and fluorine-doped tin oxide (FTO).

The number-average particle size of the metal oxide fine particles is preferably no less than 1 nm and no greater than 100 nm, more preferably no less than 2 nm and no greater than 30 nm, and even more preferably no less than 2 nm and no greater than 20 nm. In particular, it is preferable that the number-average particle size of the metal oxide fine particles be in a range of no less than 2 nm and no greater than 30 nm and that no less than 95% of the metal oxide fine particles have a particle size of no greater than 30 nm. The content by percentage of the metal oxide fine particles in the resin is preferably no less than 1 vol % and no greater than 30 vol % and more preferably no less than 5 vol % and no greater than 26 vol %.

The first resin layer 4 preferably contains fine particles of indium tin oxide (ITO fine particles), which is tin-doped indium oxide. A resin material in which the ITO fine particles are dispersed can enhance the optical performance of the multilayer diffractive optical element 1. However, the ITO fine particles have low transparency, and thus when the ITO fine particles are to be used as a material for an optical element, the film-thickness needs to be made as thin as a several micrometers or less. The average film-thickness of the first resin layer 4 in a portion other than the first grating pattern is preferably no less than 1 μm and no greater than 3 μm. In a case in which the ITO fine particles are dispersed in the first resin layer 4 (or the second resin layer 5), the first resin layer 4 is made extremely thin, and deformation of the grating pattern is likely to occur when the resin is cured.

The average film-thickness of the second resin layer 5 is preferably no less than 30 μm and no greater than 80 μm.

The first resin layer 4 (or the second resin layer 5) according to an exemplary embodiment of the present invention includes the first region 6 that satisfies Expression (1) below provided at a periphery adjacent to the grating pattern portion.

$$50 \leq w1/hd \text{ and } 0.5 \leq w2/w1 \quad (1)$$

The first resin layer 4 includes the first region 6 that has a thickness greater than the average grating height hd of the diffraction grating pattern and has a width w1 of no less than 50 times the average grating height of the diffraction grating pattern. When the first resin layer 4 is fabricated by curing the resin, an uncured resin moves from the first region 6 due to the cure shrinkage of the resin in the diffraction grating pattern portion. Accordingly, an occurrence of a sink mark in the first resin layer 4 can be suppressed, and the multilayer diffractive optical element 1 without deformation and with high diffraction efficiency can be obtained.

The first resin layer 4 (or the second resin layer 5) according to an exemplary embodiment of the present invention includes the second region 7 that satisfies $h/h1 \leq 0.34$ provided at a periphery adjacent to the first region 6. In addition, the second region 7 has a width w2 that is no less than 0.5 times the width w1 of the first region 6. Since the first resin layer 4 includes the second region 7, when the second resin layer 5 is cured and provided on the first resin layer 4, stress that remains in the step portion can be reduced to a great extent. At this point, although a step between the first region 6 and the second region 7 is large, the second region 7 in the first resin layer 4 deforms due to stress when the second resin layer 5 is cured. Accordingly, the stress in the second resin layer 5 can be dispersed to a sufficient degree. Consequently, a diffractive optical element can be obtained in which the resin peeling is less likely to occur even if the bonding strength at an interface between the resin and the glass substrate decreases due to the use for an extended period of time.

The first region 6 preferably satisfies the range defined by $1 \leq h/hd \leq 1.4$ and $50 \leq w1/hd \leq 160$. The first region 6 preferably satisfies the range defined by $69.6 \leq w1/hd \leq 104.3$. When the first region 6 is $1 > h/hd$ or $50 > w1/hd$, a sink mark occurs in the manufacturing; thus, deformation is likely to occur, and the diffraction efficiency is reduced. If $h/hd > 1.4$, the thickness of the second resin layer 5 that opposes the first region 6 is reduced; thus, the stress remains when the resin is cured, and the second resin layer 5 deforms, which leads to a decrease in the diffraction efficiency. If the first region 6 is $w1/hd > 160$, the size of the multilayer diffractive optical element 1 is increased.

The second region 7 preferably satisfies the range defined by $0.04 \leq h/h1 \leq 0.34$ and $0.5 \leq w2/w1 \leq 1$. If the second region 7 is $0.04 > h/h1$, it is difficult to form the first resin layer 4. If $h/h1 > 0.34$, the stress that remains in the step portion cannot be reduced. If the second region 7 is $0.5 > w2/w1$, the resin peeling is likely to occur; and if $w2/w1 > 1$, the size of the multilayer diffractive optical element 1 is increased.

Method for Manufacturing Multilayer Diffractive Optical Element

A method for manufacturing a multilayer diffractive optical element according to an exemplary embodiment of the present invention includes a step of forming the first resin layer and a step of forming the second resin layer.

In the method for manufacturing the multilayer diffractive optical element according to an exemplary embodiment of the present invention, a space between a mold 8 and the first substrate 2 is filled with a first energy-curable resin composite, and the first energy-curable resin composite is irradiated with energy so as to be cured. Thereafter, the step of forming the first resin layer is carried out, through which the first substrate 2 is removed from the mold 8 and the first resin layer 4 is formed on the first substrate 2.

Subsequently, a space on the first resin layer 4 formed on the first substrate 2 and between the first substrate 2 and the second substrate 3 is filled with a second energy-curable resin composite. Thereafter, the step of forming the second resin layer is carried out, through which the second energy-curable resin composite is cured and the second resin layer 5 is formed on the first resin layer 4. Thus, the multilayer diffractive optical element in which the first resin layer 4 having the first diffraction grating pattern and the second resin layer 5 having the second diffraction grating pattern are interposed between the first substrate 2 and the second substrate 3 can be fabricated.

Hereinafter, each of the steps will be described.

Figure 2:
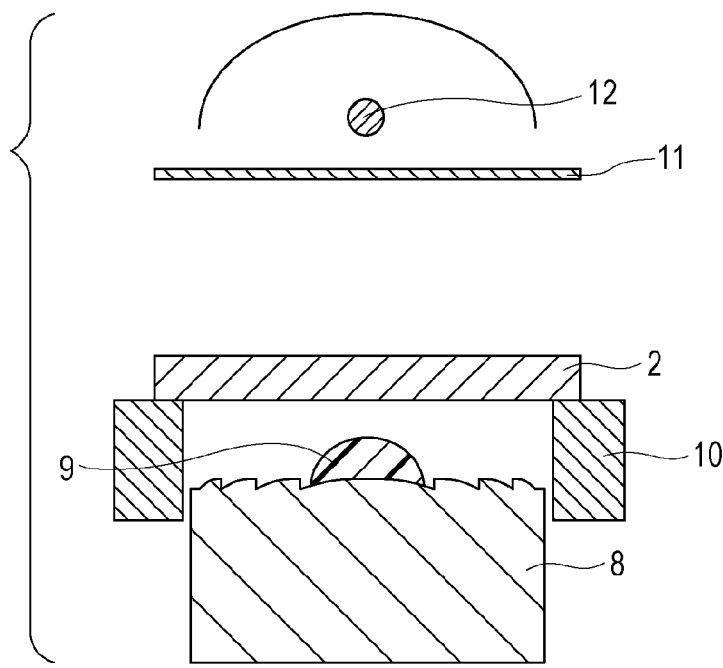
FIG. 2 is a sectional view schematically illustrating a forming step for manufacturing an element according to an exemplary embodiment of the present invention.
Figure 3:
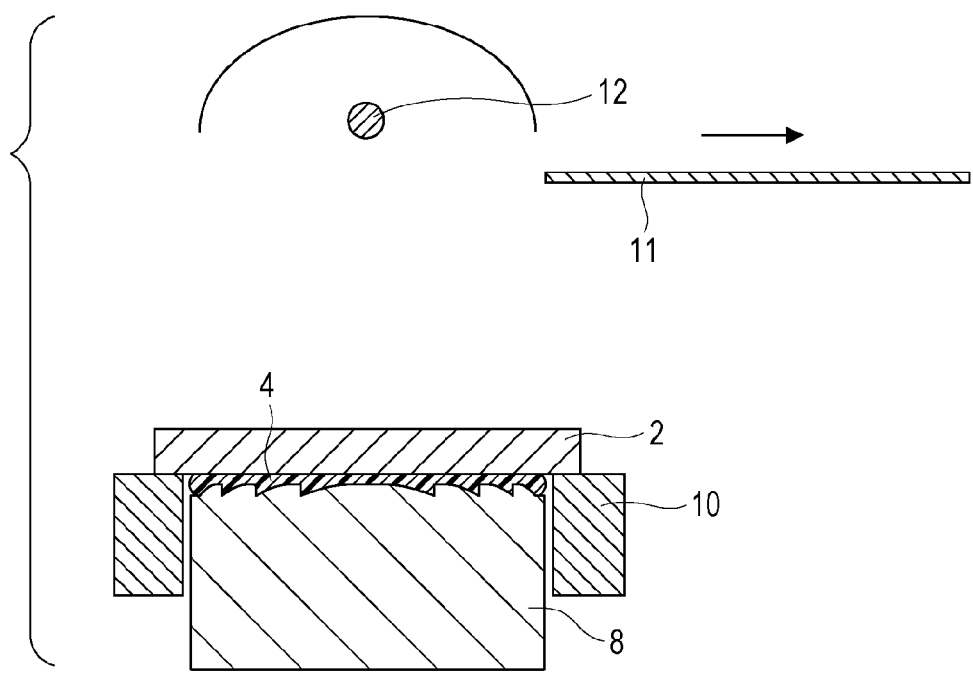
FIG. 3 is a sectional view schematically illustrating a forming step for manufacturing an element according to an exemplary embodiment of the present invention.
Figure 4:
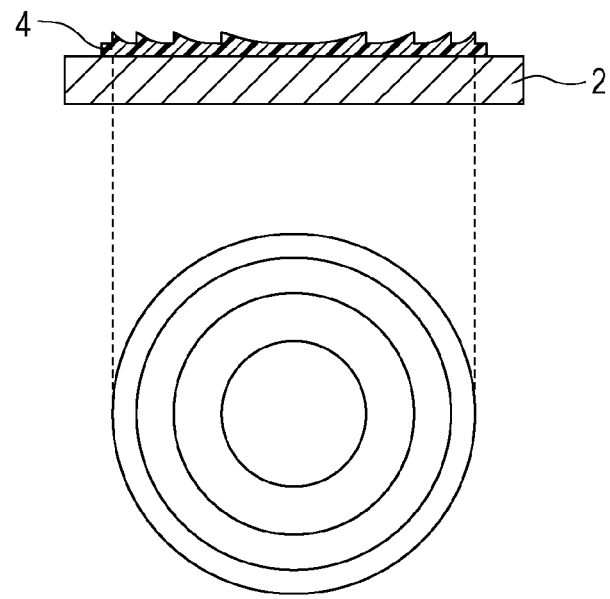
FIG. 4 is a sectional view and a top view schematically illustrating a concave diffraction grating pattern according to an exemplary embodiment of the present invention.
Figure 5:
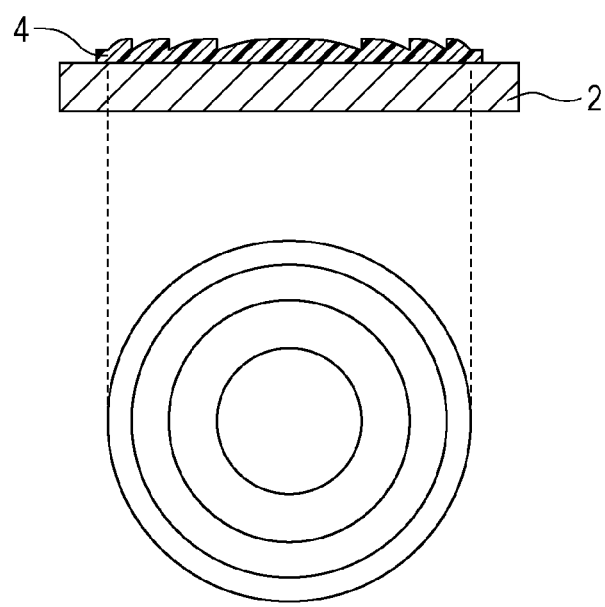
FIG. 5 is a sectional view and a top view schematically illustrating a convex diffraction grating pattern according to an exemplary embodiment of the present invention.

As illustrated in FIG. 2, in the step of forming the first resin layer, an ultraviolet-curable resin 9, which is to serve as the first resin layer 4, is put on the mold 8 dropwise, and the first substrate 2 placed on an ejector 10 is disposed so as to face the mold 8. Ultraviolet radiation from an ultraviolet lamp 12 is blocked by a shutter 11. Subsequently, as illustrated in FIG. 3, the ejector 10 is lowered, and the space between the mold 8 and the first substrate 2 is filled with the ultraviolet-curable resin 9. Thereafter, the shutter 11 is retracted, and the ultraviolet lamp 12 irradiates the ultraviolet-curable resin 9 with ultraviolet radiation so as to cure the ultraviolet-curable resin 9. Subsequently, the ejector 10 is lifted up to be released from the mold 8, and thus a diffractive optical element in which the first resin layer 4 having a grating pattern is formed on the first substrate 2 is obtained. The obtained diffractive optical element may be subjected to thermal annealing, further irradiated with ultraviolet radiation, or heated or irradiated with ultraviolet radiation in an oxygen-free atmosphere. The diffraction grating pattern formed at this point may be a concave grating pattern illustrated in FIG. 4 or may be a convex grating pattern illustrated in FIG. 5.

Figure 6:
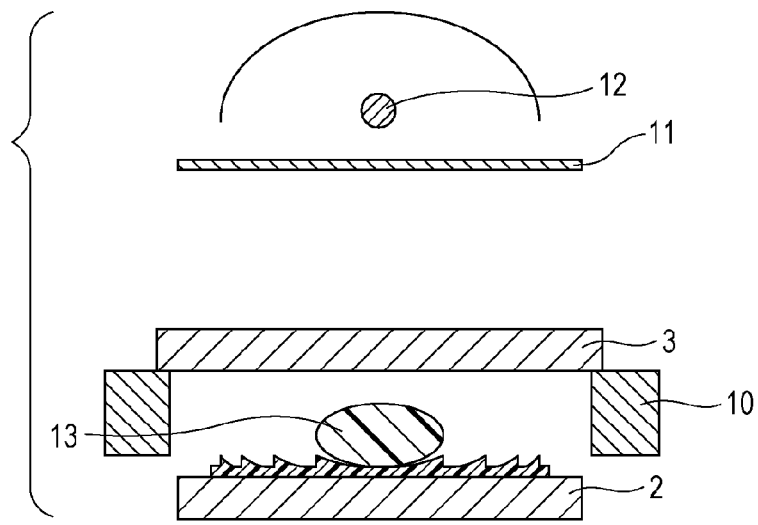
FIG. 6 is a sectional view schematically illustrating a joining step for manufacturing an element according to an exemplary embodiment of the present invention.
Figure 7:
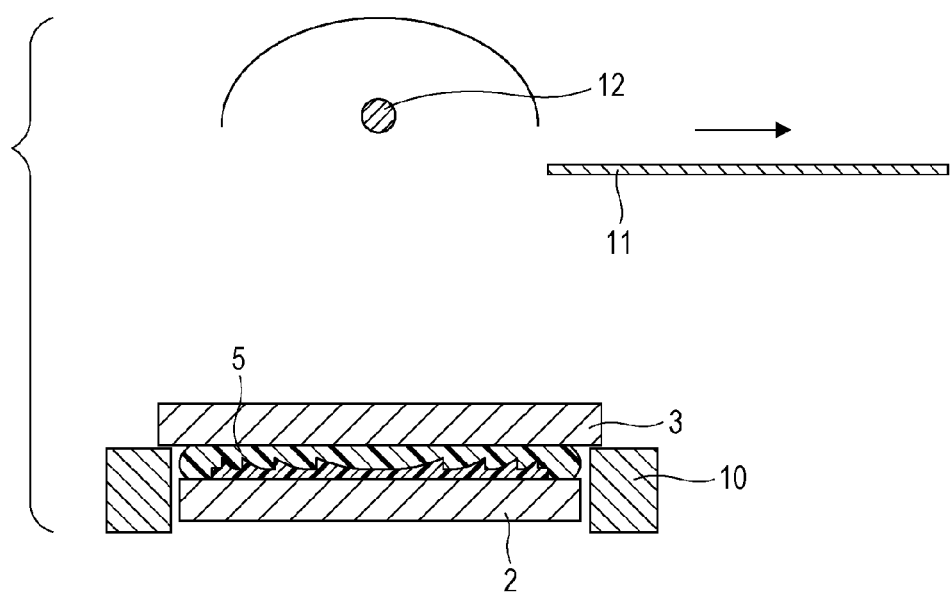
FIG. 7 is a sectional view schematically illustrating a joining step for manufacturing a multilayer diffractive optical element according to an exemplary embodiment of the present invention.

As illustrated in FIG. 6, in the step of forming the second resin layer, an ultraviolet-curable resin 13, which is to serve as the second resin layer 5, is put on the obtained optical element dropwise, and the second substrate 3 placed on the ejector 10 is disposed so as to face the optical element. Subsequently, as illustrated in FIG. 7, the ejector 10 is lowered, and the space between the diffractive optical element and the second substrate 3 is filled with the ultraviolet-curable resin 13. Thereafter, as illustrated in FIG. 7, the shutter 11 is retracted, and the ultraviolet lamp 12 irradiates the ultraviolet-curable resin 13 with ultraviolet radiation so as to cure the ultraviolet-curable resin 13. In this manner, the multilayer diffractive optical element 1 in which the first resin layer 4 having the first diffraction grating pattern and the second resin layer 5 having the second diffraction grating pattern are interposed between the first substrate 2 and the second substrate 3 is fabricated.

The obtained multilayer diffractive optical element may be subjected to thermal annealing, further irradiated with ultraviolet radiation, or heated or irradiated with ultraviolet radiation in an oxygen-free atmosphere, in order to cure the resin.

In the method for manufacturing the diffractive optical element according to an exemplary embodiment of the present invention, the materials, the conditions, and so forth described in relation to the multilayer diffractive optical element above can be used.

EXAMPLES

Hereinafter, examples of the present invention will be described.

In the examples and comparative examples, measurements and evaluations were carried out through the following methods.

Method for Measuring Grating Height, Resin Thickness, and Resin Width

A multilayer diffractive optical element was cut along a plane passing through the center of the optical axis. The section of the cut multilayer diffractive optical element was observed with a metal microscope (ECLIPSE ME600P from Nikon Corporation) at a magnification of 1000 (eyepiece: magnification of 10, objective lens: magnification of 100). The grating height, the resin thickness, and the resin width were each measured on the basis of the feed amount of an XY-stage.

Method for Measuring Particle Size of ITO Fine Particle and Zirconia Fine Particle The particle size of metal oxide fine particles was measured with a laser-type particle size analyzer (ELSZ-1000Z from Otsuka Electronics Co., Ltd.).

Evaluation of Resin Peeling in Multilayer Diffractive Optical Element

A fabricated multilayer diffractive optical element was subjected to a durability test in a high-temperature high-humidity environment (60° C., 90 RH %, 1000 hours), and the presence of resin peeling in the element was visually observed.

Evaluation of Average Diffraction Efficiency in Multilayer Diffractive Optical Element The diffraction efficiency of a multilayer diffractive optical element was measured as follows. Specifically, measurement light with a diameter of approximately 2 mm and at a wavelength of 400 nm to 700 nm was made incident on a peripheral portion of a grating pattern, and the intensity of first-order diffracted light emitted from the element was detected so as to measure the average diffraction efficiency. In this measurement, the pattern precision of the grating pattern in approximately the 67th zone to the 80th zone of the first grating pattern having 80 zones was evaluated.

Evaluation of Multilayer Diffractive Optical Element

In the evaluation of a fabricated multilayer diffractive optical element, one having resin peeling or having diffraction efficiency of less than 99.0% after a high-temperature high-humidity durability test was marked as C. One without resin peeling and having diffraction efficiency of no less than 99.0% and less than 99.5% after a high-temperature high-humidity durability test was marked as B, and one having diffraction efficiency of no less than 99.5% was marked as A.

Example 1

A multilayer diffractive optical element was fabricated through the following manufacturing method, and resin peeling and average diffraction efficiency were evaluated.

The first substrate was constituted by an optical glass (S-BSL7 from Ohara Incorporated), which is a glass lens that measures 50 mm in diameter and has a planar surface on one side and a convex spherical surface with R of 80 mm on the other side. The second substrate was constituted by an optical glass (S-BSL7 from Ohara Incorporated), which is a glass lens that measures 55 mm in diameter and has a concave spherical surface with R of 80 mm on one side and a convex spherical surface with R of 150 mm on the other side. The mold obtained as follows was used. Specifically, a NiP layer plated on a metal base material was subjected to machining with a precision machining device. Thus, a mold with a pattern in which the desired first diffraction grating pattern and a peripheral pattern were inverted was formed.

A space between the mold and the first substrate was filled with a first resin composite of an ultraviolet-curable acrylic resin. Specifically, the first resin composite in which ITO fine particles having a number-average particle size of 15 nm was dispersed in 16 vol % in a mixture of tris(2-acryloxyethyl)isocyanurate in 25 mass %, pentaerythritol triacrylate in 30 mass %, dicyclopentenyloxyethyl methacrylate in 43 mass %, and 1-hydroxycyclohexyl phenyl ketone in 2 mass %. Thereafter, the entire surface was irradiated with ultraviolet radiation with an intensity of 1 mW/cm$^2$ at 365 nm for 200 seconds so as to cure the resin composite. Thus, the first resin layer was formed on the first substrate, and the optical element was fabricated.

Subsequently, the obtained diffractive optical element released from the mold was placed in an oven and heated for 24 hours at a temperature of 80° C. Thereafter, a space between the diffractive optical element and the second substrate was filled with a second resin composite in which zirconia fine particles having a number-average particle size of 3 nm were dispersed in 20 vol % in an ultraviolet-curable acrylic resin, and the entire surface was irradiated with ultraviolet radiation for 200 seconds so as to cure the second resin composite; thus, a joined body was obtained. Thereafter, the entire surface of the obtained joined body was irradiated with ultraviolet radiation with an intensity of 30 mW/cm² at 365 nm for 1000 seconds. Lastly, the obtained joined body was placed in an oven and heated for 72 hours at a temperature of 80° C., and thus a multilayer diffractive optical element 101 was fabricated.

The first resin layer of the multilayer diffractive optical element 101 had a refractive index of 1.57 and an Abbe number of 19.3, and the second resin layer had a refractive index of 1.62 and an Abbe number of 43.7.

Figure 8:
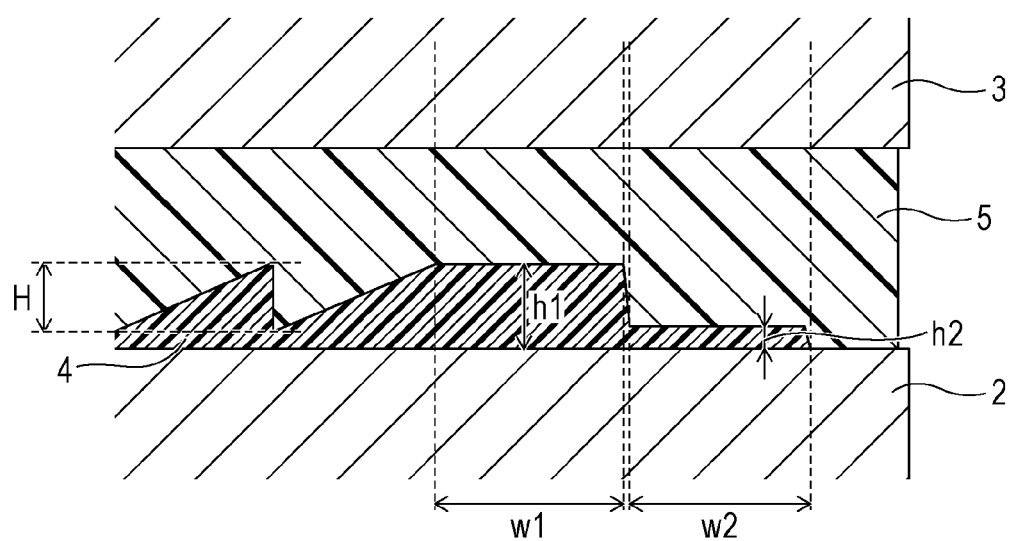
FIG. 8 is a sectional view schematically illustrating the shape of an edge portion of a multilayer diffractive optical element according to an exemplary embodiment of the present invention.

The diffraction grating pattern of the multilayer diffractive optical element 101 had a gentle concave slope relative to the convex spherical surface having R of 80 mm, which served as a base. In the multilayer diffractive optical element 101, the zone width of a first zone was 3.1 mm, the zone width of a second zone was 1.2 mm. The zone width is continuously reduced thereafter, and the zone width of the 80th zone, which is the outermost zone, was 0.12 mm. In addition, as illustrated in FIG. 8, the grating height H of the grating pattern was 11.2 μm at the first zone and 11.8 μm at the 80th zone, and the average grating height hd was 11.5 μm. In addition, in the 80th zone, the thickness of the first resin layer other than the diffraction grating pattern was 2.0 μm, and the thickness of the second resin layer was 40 μm. In other words, the gap between the two glass substrates was approximately 53.8 μm.

As illustrated in FIG. 8, in the peripheral portion adjacent to the grating pattern portion, the planar first region 6 having an average thickness h1 of 12.0 μm and a width w1 of 1.2 mm was formed. In addition, in the peripheral portion of the first region 6, the planar second region 7 having an average thickness h2 of 2.0 μm and a width w2 of 0.8 mm was formed.

The result of evaluating the multilayer diffractive optical element 101 according to the example 1 is indicated in Table 1.

Example 2

In an example 2, a multilayer diffractive optical element 102 was fabricated through a method similar to the method of the example 1 except that a mold corresponding to the peripheral pattern was different from that of the multilayer diffractive optical element in the example 1.

The multilayer diffractive optical element 102 of the example 2 had the planar first region 6 having an average thickness h1 of 16.0 μm and a width w1 of 1.0 mm and the planar second region 7 having an average thickness h2 of 2.0 μm and a width w2 of 1.0 mm.

The evaluation result is indicated in Table 1.

Example 3

In an example 3, a multilayer diffractive optical element 103 was fabricated through a method similar to the method of the example 1 except that a mold corresponding to the peripheral pattern was different from that of the multilayer diffractive optical element in the example 1.

The multilayer diffractive optical element 103 of the example 3 had the planar first region 6 having an average thickness h1 of 12.0 μm and a width w1 of 1.2 mm and the planar second region 7 having an average thickness h2 of 2.0 μm and a width w2 of 0.6 mm.

The evaluation result is indicated in Table 1.

Example 4

In an example 4, a multilayer diffractive optical element 104 was fabricated through a method similar to the method of the example 1 except that a mold corresponding to the peripheral pattern was different from that of the multilayer diffractive optical element in the example 1.

The multilayer diffractive optical element 104 of the example 4 had the planar first region 6 having an average thickness h1 of 12.0 μm and a width w1 of 1.2 mm. In addition, a planar portion having a width of 0.4 mm, which is to serve as the second region 7, was present at a periphery of the first region 6, and the first resin layer had a thickness of 4.0 μm in the stated planar portion. Furthermore, another planar portion having a width of 0.4 mm, which is to serve as the second region 7, was present at a periphery of the aforementioned planar portion, and the first resin layer has a thickness of 0.5 μm in the stated planar portion. The second region 7 had a width w2 of 0.8 mm in total.

Example 5

In an example 5, a multilayer diffractive optical element 105 was fabricated through a method similar to the method of the example 1 except that a mold corresponding to the peripheral pattern was different from that of the multilayer diffractive optical element in the example 1.

The multilayer diffractive optical element 105 of the example 5 had the planar first region 6 having an average thickness h1 of 12.0 μm and a width w1 of 1.2 mm and the planar second region 7 having an average thickness h2 of 0.5 μm and a width w2 of 0.8 mm.

Example 6

In an example 6, a multilayer diffractive optical element 106 was fabricated through a method similar to the method of the example 1 except that a mold corresponding to the peripheral pattern was different from that of the multilayer diffractive optical element in the example 1.

The multilayer diffractive optical element 106 of the example 6 had the planar first region 6 having an average thickness h1 of 12.0 μm and a width w1 of 0.8 mm and the planar second region 7 having an average thickness h2 of 2.0 μm and a width w2 of 0.8 mm.

The evaluation result is indicated in Table 1.

Example 7

In an example 7, a multilayer optical element 107 was fabricated through a method similar to the method of the example 1 except that the grating pattern had a convex shape.

The evaluation result is indicated in Table 1.

Comparative Example 1

In a comparative example 1, a multilayer diffractive optical element 108 was fabricated through a method similar to the method of the example 1 except that a mold different from the mold of the example 1 was used. Specifically, the second region was not formed.

In the multilayer diffractive optical element 108 of the comparative example 1, the first region in the first resin layer 4 had an average thickness h1 of 12.0 μm and a width w1 of 2.0 mm, and the second region was not present.

The evaluation result is indicated in Table 1.

Comparative Example 2

In a comparative example 2, a multilayer diffractive optical element 109 was fabricated through a method similar to the method of the example 1 except that a mold different from the mold of the example 1 was used. Specifically, the first resin layer had a tapered shape whose thickness varies from 16.0 μm to 0 μm within 2.0 mm in width from the periphery of the grating pattern.

In the multilayer diffractive optical element 109, the first resin layer in the first region had an average thickness h1 of 13.8 μm, the first region had a width w1 of 0.5 mm. The second region had a width w2 of 0.5 mm.

The evaluation result is indicated in Table 1.

Comparative Example 3

In a comparative example 3, a multilayer diffractive optical element 110 was fabricated through a method similar to the method of the example 1 except that a mold different from the mold of the example 1 was used. Specifically, the mold did not satisfy the condition of the second region according to an exemplary embodiment of the present invention.

In the multilayer diffractive optical element 110, the first region in the first resin layer 4 had an average thickness h1 of 12.0 μm and a width w1 of 1.2 mm. The average thickness h2 was 5.0 μm, and a region that did not satisfy the condition of the second region according to an exemplary embodiment of the present invention had a width w2 of 1.2 mm.

The evaluation result is indicated in Table 1.

Comparative Example 4

In a comparative example 4, a multilayer diffractive optical element 111 was fabricated through a method similar to the method of the example 1 except that a mold different from the mold of the example 1 was used. Specifically, the mold did not satisfy the condition of the second region according to an exemplary embodiment of the present invention.

In the multilayer diffractive optical element 111, the first region in the first resin layer 4 had an average thickness h1 of 12.0 μm and a width w1 of 1.2 mm. The average thickness h2 was 2.0 μm, and the width w2 was 0.4 mm. There was a region that did not satisfy the condition of the second region.

The evaluation result is indicated in Table 1.

Comparative Example 5

In a comparative example 5, a multilayer diffractive optical element 112 was fabricated through a method similar to the method of the example 1 except that a mold different from the mold of the example 1 was used. Specifically, the mold did not satisfy the condition of the first region and the second region according to an exemplary embodiment of the present invention.

In the multilayer diffractive optical element 112, with respect to the peripheral pattern, there was a planar portion having a width of 1.2 mm present at a periphery of a relief pattern, and the thickness of the first resin layer in the planar portion was 11.0 μm. Another planar portion, which is to serve as the second region, having a width of 0.8 mm was present at a periphery of the aforementioned planar portion, and the thickness of the first resin layer in the stated planar portion was 2.0 μm. In other words, the first region and the second region were not present.

The evaluation result is indicated in Table 1.

TABLE 1

| | w1/hd | w2/w1 | resin peeling | average diffraction efficiency | evaluation of optical element |
|---|---|---|---|---|---|
| example 1 | 104.3 | 0.75 | absent | 99.6% | A |
| example 2 | 87.0 | 1.00 | absent | 99.6% | A |
| example 3 | 104.3 | 0.50 | absent | 99.5% | A |
| example 4 | 104.3 | 0.75 | absent | 99.6% | A |
| example 5 | 104.3 | 0.75 | absent | 99.5% | A |
| example 6 | 69.6 | 1.00 | absent | 99.1% | B |
| example 7 | 104.3 | 0.75 | absent | 99.6% | A |
| comparative example 1 | 173.9 | — | present | 99.6% | C |
| comparative example 2 | 43.5 | 1.00 | absent | 98.6% | C |
| comparative example 3 | 104.3 | — | present | 99.6% | C |
| comparative example 4 | 104.3 | 0.33 | present | 99.5% | C |
| comparative example 5 | — | — | absent | 98.7% | C |

Evaluation

The first resin layer includes the first region that satisfies $1 \leq h/hd$ and the second region that satisfies $h/h1 \leq 0.34$. The expression (1) is satisfied, in which w1 represents the width of the first region in the radial direction and w2 represents the width of the second region in the radial direction. It was found that, when these conditions were satisfied, a multilayer diffractive optical element in which the resin peeling did not occur after a durability test in a high-temperature high-humidity environment and that had average diffraction efficiency of greater than 99.0% could be obtained.

The multilayer diffractive optical element according to an exemplary embodiment of the present invention has high diffraction efficiency and is less likely to experience resin peeling even after being used for an extended period of time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-186856 filed Sep. 12, 2014, which is hereby incorporated by reference herein in its entirety.

What is claimed is:
1. A multilayer diffractive optical element, comprising:
a first substrate;
a second substrate;
a first resin layer having a first diffraction grating pattern disposed on the first substrate; and
a second resin layer having a second diffraction grating pattern disposed on the second substrate,
wherein the first diffraction grating pattern and the second diffraction grating pattern oppose each other in adhesion to each other,
wherein the first resin layer includes a first region provided at a peripheral portion adjacent to a portion of the first diffraction grating pattern, the first region satisfying $1 \leq h_{R1}/hd$, wherein $h_{R1}$ represents a thickness of the first resin layer in a direction normal to a surface of the first substrate, and hd represents an average grating height of the first diffraction grating pattern,
wherein the first resin layer includes a second region provided at a peripheral portion adjacent to the first region, the second region satisfying $h_{R2}/h1 \leq 0.34$, wherein hR2 represents a thickness of the second region in a direction normal to a surface of the first substrate, and h1 represents an average thickness of the first region, and wherein Expression (1) below is satisfied, $50 \leq w1/hd$ and $0.5 \leq w2/w1$ (1), wherein w1 represents a width of the first region in a radial direction along a plane parallel to the surface of the first substrate, and w2 represents a width of the second region in the radial direction along a plane parallel to the surface of the first substrate, and wherein the first resin layer and the second resin layer are in adhesion to each other at the first region and the second region.

2. The multilayer diffractive optical element according to claim 1, wherein the first region satisfies $1 \leq h_{R1}/hd \leq 1.4$ and $50 \leq w1/hd \leq 160$, and wherein the second region satisfies $0.04 \leq h_{R2}/h1 \leq 0.34$ and $0.5 \leq w2/w1 \leq 1$.

3. The multilayer diffractive optical element according to claim 1, wherein the multilayer diffractive optical element is an optical lens.

4. The multilayer diffractive optical element according to claim 1, wherein one of the first resin layer and the second resin layer includes an indium tin oxide fine particle.

5. The multilayer diffractive optical element according to claim 1, wherein the first resin layer has an average thickness of greater than 1 μm and less than 3 μm at a portion other than the first diffraction grating pattern, and includes an indium tin oxide particle dispersed therein, the indium tin oxide particle having a number-average particle size of greater than 1 nm and less than 100 nm.

6. The multilayer diffractive optical element according to claim 1, wherein the first resin layer has a refractive index of no less than 1.54 and no greater than 1.63 and an Abbe number of no less than 42 and no greater than 57, and wherein the second resin layer has a refractive index of no less than 1.48 and no greater than 1.57 and an Abbe number of no less than 14 and no greater than 28.

7. The multilayer diffractive optical element according to claim 1, wherein the first resin layer and the second resin layer contain energy-curable resin.

8. The multilayer diffractive optical element according to claim 1, wherein the second resin layer covers an outer peripheral portion of the first resin layer, and is in adhesion with the first substrate.

* * * * *